2,843,643
RUBBER CONTAINING DEMETHYLATED WOOD TAR DISTILLATE

William K. T. Gleim, Island Lake, Ill., assignor to Universal Oil Products Company, Des Plaines, Ill., a corporation of Delaware No Drawing. Application May 14, 1956
Serial No. 584,468

6 Claims. (Cl. 260—758)

This invention relates to a novel method of preventing the cracking of rubber due to attack by ozone.

The presence of ozone in the atmosphere appears to be increasing, in certain localities, apparently due to a complex reaction of oxygen and atmospheric nitrogen oxides with olefins. This increase in ozone concentration in the atmosphere has resulted in cracking of rubber products to a considerable extent that means must be provided to prevent this cracking of the rubber products.

The cracking of rubber caused by ozone is entirely different from the deterioration of rubber caused by oxidative reactions. The cracking due to ozone is a surface reaction, and the resulting cracks appear to be the focal point for failure caused by flex fatigue. In investigating this new problem of ozone cracking, it has been found that most of the antioxidants which will inhibit oxidative deterioration could not be used as an antioxidant to prevent cracking due to ozone for various reasons including: (1) the inhibitor was ineffective for this purpose and in some cases actually promoted ozone cracking, (2) the inhibitor did not possess proper physical properties and would not be distributed to and maintained at the surface of the rubber in order to there prevent attack by ozone, (3) the inhibitor was toxic and therefore could not be handled safely by the workers, (4) the inhibitor had an undesirable sensitivity effect and could not be handled safely by the workers, (5) cost of preparation of the inhibitor was excessive and thereby precluded it from commercial use, and for various other reasons.

As hereinbefore set forth, the present invention provides a novel method of preventing the cracking of rubber due to ozone. The present process is particularly applicable to the stabilization of natural rubber. Natural rubber generally is regarded as comprising naturally occurring isoprene polymers. The natural rubbers include Hevea rubber, caoutchouc, balata, gutta percha, etc. Although natural rubber appears to have better tear resistance during normal service than synthetic rubber, the natural rubber does undergo ozone cracking and, in unusual service or long periods of service, does fail because of ozone cracking. Furthermore, the presence of cracks in rubber products also is objectionable for aesthetic reasons. Customers and users of rubber products object to the unsightly cracks in the rubber and, therefore, it is important that such cracks be avoided.

While the present invention is particularly applicable for use in natural rubber, it is understood that the invention can be utilized for preventing ozone cracking in synthetic rubber. Much of the synthetic rubber now being produced commercially is known in the art as GR–S rubber and is a copolymer of butadiene and styrene. Other synthetic rubbers include those produced from butadiene and acrylonitrile (Buna–N), butadiene and isobutylene (butyl rubber), etc. Still other synthetic rubbers include Thiokol rubber, silicone rubber, neoprene rubber, etc.

In one embodiment, the present invention relates to a method of preventing the cracking of rubber due to ozone which comprises incorporating therein an antiozidative concentration of demethylated hardwood tar distillate.

In a specific embodiment, the present invention relates to a method of preventing the cracking of natural rubber due to ozone which comprises incorporating in said rubber from about 0.25% to about 10% by weight of demethylated settled hardwood tar distillate boiling between about 270° C. and 340° C. Hardwood is defined as the wood of angiosperms for the purpose of this invention.

In another embodiment, the present invention relates to a rubber stabilized against cracking due to ozone by incorporating in the rubber an antiozidative concentration of demethylated hardwood tar distillate.

As hereinbefore set forth, a hardwood tar distillate is subjected to demethylation in order to produce the antiozidant of the present invention. Any suitable hardwood tar distillate may be used in accordance with the present invention. The tar distillate is obtained by the distillation of hardwoods including hickory, oak, beech, walnut, etc. The distillate obtained by the distillation of hardwood may be subjected to demethylation. However, the hardwood tar distillate may be fractionated to separate a selected cut which then is subjected to demethylation or the hardwood tar distillate may be settled to separate a settled distillate from water-soluble tars and the settled distillate then is subjected to demethylation or is fractionated to separate a selected cut which is subjected to demethylation.

In a preferred embodiment, the selected cut of demethylated hardwood tar distillate for use in accordance with the present invention has a boiling range of from about 270° C. to about 340° C. and still more preferably of from about 285° C. to about 330° C. As hereinbefore set forth, the selected cut may be separated from the other components and then subjected to demethylation or the original hardwood tar distillate may be subjected to demethylation and then the selected fraction separated. It appears that the distillate fraction boiling below about 270° C. is less effective as an antiozidant and, for improved antiozidant properties, it is preferred that the demethylated hardwood tar distillate has an initial boiling point of about 270° C. Also, it generally is preferred that the selected cut has an end boiling point of about 340° C. as higher boiling materials appear to contain components which are not as desirable for use in rubber. However, as hereinbefore set forth, the selected cut is utilized for maximum antiozidative protection with the understanding that, when these maximum properties are not required, the full boiling range demethylated hardwood tar distillate may be employed.

Demethylation of the hardwood tar is effected in any suitable manner. In a preferred method, the hardwood tar distillate is treated with a hydrogen halide, and particularly hydrogen chloride, hydrogen bromide or hydrogen iodide, at a temperature preferably within the range of from about 90° C. to about 260° C. This treatment is effected at substantially atmospheric pressure or at an elevated temperature which generally will not be above about 35 kg. per square centimeter. While a hydrogen halide generally is preferred as the demethylating agent, it is understood that other suitable demethylating agents may be employed including, for example, aqueous solutions of ammonium chloride, magnesium chloride, etc. It is understood that the hydrogen halides can be employed as the salts of amines as for instance aniline, pyridine, etc. The concentration of hydrogen halide used in the demethylation treatment generally will be within the range of from about 1 to about 5 pounds of hydrogen halide per gallon of tar fraction to be treated, although higher or lower concentrations may be employed. It is understood that the hydrogen halide may be regenerated by suitable means, including burning in the presence of oxygen or air, and reused in the demethylation process. The demethylated wood tar is separated from the demethylation zone and either is used as such for the stabilization of rubber or is subjected to fractionation to separate a selected cut as hereinbefore set forth.

It is understood that the demethylated wood tar fraction of the present invention can be utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozidant of the present invention can be used in reclaims and latices of rubbery materials, whether or not admixed with fillers, pigments, accelerating agents, etc. In another embodiment the present invention can be utilized for the stabilization of adhesives, elastomers, etc. which tend to crack due to ozone.

In general, the antiozidant is utilized in a concentration of from about 0.25 to 10% by weight of the rubber hydrocarbon and preferably in a concentration of from about 2% to about 5% by weight thereof. These concentrations are based on the rubber hydrocarbon, exclusive of the other components of the final rubber composition, and are used in this manner in the present specifications and claims. It is understood that the antiozidant of the present invention is utilizable along with other additives incorporated in rubber for specific purposes including, for example, antioxidants, accelerators, softeners, extenders, wax, reinforcing agents, etc.

The antiozidant of the present invention also possesses antioxidant properties and, therefore, will serve to prevent both cracking due to ozone and deterioration due to oxygen. However, in many cases, it is desirable to employ a separate antioxidant and, in such cases, the antiozidant of the present invention is employed along with a separate antioxidant. Any suitable antioxidant may be employed including, for example, phenyl-beta-naphthylamine, 6 - phenyl-2,2,4-trimethyl-1,2-dihydroquinoline, marketed under the trade name of "Santoflex-B," 2,2'-methylene-bis-(4-methyl-6-tert-butyl-phenol), 2,6 - di-tert - butyl - p-cresol, the reaction product of acetone and diphenylamine, marketed under the trade name of "B. L. E.," etc. These antioxidants generally are used in a concentration from about 0.5% to about 3% by weight of the rubber.

The antiozidant of the present invention also normally is employed along with paraffin and/or microcrystalline wax. The wax generally is utilized in a concentration of from about 0.5% to about 3% by weight of the rubber.

In one embodiment, the antiozidant of the present invention is admixed with the antioxidant and/or wax, and the mixture then is composited with one or more of the other components of the rubber composition.

The antiozidant of the present invention is incorporated in rubber or rubbery products in any suitable manner and at any suitable stage of preparation. When the antiozidant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a paste, etc.

The following example is introduced to illustrate further the novelty and utility of the present invention but not with the intention of unduly limiting the same.

*Example I*

The data reported in the following example was obtained with a sample of rubber being manufactured by one of the rubber companies and marketed for commercial use. The rubber was cut into strips of 6.00" x 0.50" x 0.075". In the sample containing additive, the additive was incorporated into the rubber sample by immersing and swelling the sample in a solution containing the demethylated hardwood tar distillate and toluene as a solvent. The concentration of the additive was selected to leave in the rubber sample, after the toluene had been removed, a concentration of about 3 parts of demethylated wood tar distillate per 100 parts by weight of rubber hydrocarbon. The rubber sample remained in the solution for about 16 hours and, after this time, the toluene was evaporated by exposing the sample to air at room temperature for 2 hours, followed by heating for 1 hour at about 195° F. in an air oven. After cooling, the samples were elongated 20% and mounted on one or more waxed wooden panels. The samples then were exposed in an ozone cabinet at a temperature of about 100° F. to air containing 30 parts of ozone per 100 million parts of air.

The demethylated wood tar used in this example had a nominal boiling range of from about 270 to about 340° C. As mentioned above, it was incorporated in a concentration of about 3 parts per 100 parts by weight of rubber hydrocarbon. The rubber used in this example is a white natural rubber stock.

When the control sample of the rubber (sample not containing this additive) was exposed in the ozone cabinet to air containing about 30 parts of ozone per 100 million parts of air, cracks appeared in the rubber in about 6 hours. On the other hand, in the sample of the rubber containing the demethylated hardwood tar distillate, visible cracks did not appear in the rubber until after about 52 hours of exposure in the ozone cabinet. From the above data, it will be noted that the demethylated wood tar distillate was effective in considerably retarding cracking of the rubber due to ozone.

I claim as my invention:

1. A rubber normally subject to cracking due to ozone containing from about 0.25% to about 10% by weight of demethylated wood tar distillate as a retarder of said cracking.

2. A natural rubber normally subject to cracking due to ozone containing from about 0.25% to about 10% by weight of demethylated hardwood tar distillate boiling between about 270° C. and 340° C. as a retarder of said cracking.

3. A natural rubber normally subject to cracking due to ozone containing from about 0.25% to about 10% by weight of demethylated hardwood tar distillate boiling between about 285° C. and 330° C. as a retarder of said cracking.

4. A rubber normally subject to cracking by the action of ozone containing, in a sufficient concentration to retard said cracking, a demethylated hardwood tar distillate.

5. Natural rubber normally subject to cracking by the action of ozone containing, in a sufficient amount to retard said cracking, demethylated hardwood tar distillate boiling between about 270° C. and 340° C.

6. Natural rubber normally subject to cracking by the action of ozone containing, in a sufficient amount to retard said cracking, demethylated settled hardwood tar distillate boiling between about 285° C. and 330° C.

References Cited in the file of this patent

UNITED STATES PATENTS

| | | |
|---|---|---|
| 2,296,363 | Messer | Sept. 22, 1942 |
| 2,551,737 | Haensel | May 8, 1951 |
| 2,591,651 | Young | Apr. 1, 1952 |
| 2,628,953 | Newby | Feb. 17, 1953 |